United States Patent [19]
Bemer

[11] Patent Number: 5,978,809
[45] Date of Patent: Nov. 2, 1999

[54] METHOD OF SOLVING MILLENNIUM PROBLEMS OF SOME APPLICATION PROGRAMS

[76] Inventor: Robert W. Bemer, 2 Moon Mountain Trail, Phoenix, Ariz. 85023

[21] Appl. No.: 08/789,943

[22] Filed: Jan. 27, 1997

[51] Int. Cl.⁶ .................................................. G06F 17/30
[52] U.S. Cl. .............................................. 707/101; 707/6
[58] Field of Search .................................. 707/1, 6, 100, 707/101

[56] References Cited

U.S. PATENT DOCUMENTS

| | | | |
|---|---|---|---|
| 4,001,570 | 1/1977 | Gooding et al. | 364/771 |
| 5,600,836 | 2/1997 | Alter | 707/101 |
| 5,644,762 | 7/1997 | Soeder | 707/6 |
| 5,668,989 | 9/1997 | Mao | 707/101 |

OTHER PUBLICATIONS

Hart et al. "A Scaleable, Automated Process for Year 200 System Correction", Proceedings of ICSE–18, pp. 475–484, Mar. 1996.

Abel, IBM PC Assembly Language and Programming, Second Edition, Prentice Hall, pp. 113–114, and 211–228 Dec. 1991.

Theodore Swoyer: A Strategy for Handling the Year 2000 Problem: EDPACS—The EDP Audit, Control and Security Newsletter, vol. xxiii, No. 11 May 1996, Boston, MA, pp. 1–13, XP000675496.

Peter de Jager, "Biting the Silver Bullet", available from the Internet via <URL: http://www.year2000.com/archive/bullet.html>, Apr. 5, 1998, SP002064192.

C. Lawrence Meador, "Solving the Year 2000 Problem", Information Week, Feb. 5, 1996, pp. 44–51, XP000571029.

Georges Brigham, "The Year 2000", Communications of the ACM, vol. 40, No. 5, May 1997, pp. 113–115, XP000703646.

Robert A. Martin, "Dealing with Dates: Solutions for the Year 2000", Computer, vol. 30, No. 3, Mar. 1997, pp. 44–51, XP000657325.

"The Year 2000 and 2–Digit Dates: A Guide for Planning and Implementation", Third Edition, IBM Publication, May 1996.

*Primary Examiner*—Jack M. Choules
*Attorney, Agent, or Firm*—Carr & Storm, LLP

[57] ABSTRACT

A method for increasing the capabilities of an object program of a digital data processing system having a coded character set, with each character having a given attribute, by providing each of a selected subset, or subsets, of said characters with a second attribute. Which attribute of a given character of such a subset is its relevant attribute is determined by such a character being the operand of a limited number of operation codes of the computer system capable of properly acting on the second attribute of the character of such a selected subset. The data entry routine of such a program is modified to require data represented by the second attributes of the selected subsets and to convert such data into a character of such a subset. For each operation code capable of properly acting on the second attribute of a character of a selected subset of said characters, a subroutine is created to check each operand acted upon by the operation code for the presence of character of a selected subset and to convert such an operand into a format upon with the desired operation can be executed. Each data output operation of an object program capable of outputting the second attribute of such a character is provided with the means to output where appropriate a graphic character, or characters, defining such a second attribute.

13 Claims, 3 Drawing Sheets

METHOD OF SOLVING MILLENNIUM PROBLEMS OF SOME APPLICATION PROGRAMS

FIELD OF THE INVENTION

This invention relates to application programs of digital data processing systems, particularly those in which the year portion of a date has been limited to two digits (Arabic numerals 0–9) that represent decade (D) and year of decade (Y) of a year value, with digits (M) for the millennium and (C) for the century being implied, or understood, as being "1" & "9". With the proximity of the next millennium, when M and C will have the values of "2" & "0", there is a need to modify such programs to be able to accept four digits to define the year value, or portion, of a date, readily identifiable as such, to perform required decimal arithmetic operations on the year value of a date, and to output data specifying years in four digits, or their equivalent, when required.

This is ideally accomplished without requiring more memory space to store the representation for MCDY than that previously required to store the representation of just DY. Also, year increment values need unique identification. This invention does this by providing an additional, or second, attribute to selected subsets of characters of the coded character set of the program, so that year values and year increment values can be recognized as such, the second attribute associated with these selected subsets being determined by their usage. Such a second attribute permits the year value of a date to be stored in memory in the same space, and at the same address, as required for the conventional representation of "DY".

In the following text, the term "digit" is reserved to always denot an Arabic numeral 0–9. The coded characters (usually of 8 bits) called "digit characters" are those characters of a coded character set containing digit values as defined by their binary equivalents in the low order 4 bits.

BACKGROUND OF THE INVENTION

Application programs are normally compiled from a fairly understandable source language program into a computer-specific object program, which object program may be understood by itself by only the most expert programmers. If the source language program is lost or misplaced, the object program can be patched only by someone who knows the principle of its working. But people die and move away. It is unarguable that many of today's most important programs are indecipherable as to principle, or algorithm.

It is basic to computers of the Von Neumann type, e.g., stored program type, that data can exist in boundaryless juxtaposition in the memory of such systems with other data, or even sections of the program. Existing data, new data, and the object program that operates upon them are an amorphous mix. The program itself may be recognized only by the sequence of its instructions.

The location of data in memory is known only by the addresses embedded in the program. With respect to the nature of the data itself, there are few clues. Without such clues it is impossible to distinguish a field containing the year portion of a date from any other pair of digit characters, or what instructions manipulate that field. Further, the proper execution of a program depends upon the finding of the correct data, not by name, not by descriptor, not by content, but by its relative position in the memory of the computer system executing the program.

The so-called millennium problem is the consequence of the history of development of digital computer systems which began in the 1940's, but which were not put into extensive use until the last half of the 20th century. Thus, from the beginning of the computer era to now, the millennium and the century have had constant digit values of 1 and 9. For convenience and to minimize size of memory required to execute such a program, the practice was to enter, to store, to perform arithmetic operations as required, and to output only two digits to represent the decade D and the year Y for the year value of a date. Reasons justifying this practice were that the sizes of the memories of early computer systems were relatively small, and their cost was very high. This practice is now a well-recognized problem, reportedly being worked on by many thousands of people.

The crux of the millennium problem is not that calendar year values are expressed in only two digit characters. It is rather that it is very difficult, when faced with a need to compute with and display them in a clearly recognizable form, such as in a 4-digit form, to recognize sans ambiguity a calendar year value, or calendar year increment value, hidden away in all that maze of existing data and instructions that consist only of 0's and 1's. Even if calendar year values were stored as 4 digit characters, how would one know "1990" to be a year value rather than a portion of a part number, a social security number, a vehicle I.D. code, a bar code identifier, a number of acres, an insurance policy number, a real estate deed number, a portion of a binary number (even floating point), etc. Barring source code change, as by the Picture Clause of COBOL, even entry of new year data as 4 digit characters does nothing to resolve this dilemma. Absent source code, the nature of data in memory may only be deduced via some limitations of the operations upon it.

One solution being pursued to solve the millennium problem is to detect the year value of dates of the source language version of the program, or of the object program if the source version is not available, and to modify the program so that the millennium and century digit characters, $\underline{M}$ and $\underline{C}$, representing 1900 or 2000 are incorporated correctly in both program and its data descriptions. To do this, one has to search, or trace, through the program to find occurrences of numeric data and numeric data operations. Doing this by using Picture Clauses in source programs and then recompiling to a new object program is the optimum solution, albeit uncommon due to loss of much source code. Alternatively, one could replace all old code operating on date values with new code of a better method; e.g. one that always operates internally on dates in the Julian Day form. Unfortunately there does not seem to be time to implement either of these solutions before the year 2000 AD becomes a cause of failure.

SUMMARY OF THE INVENTION

An enabling component of this invention is "Year Arithmetic", a coined and limiting term that recognizes that calendar year and year increment values have many special properties and restrictions that reduce the domain of arithmetic operations upon them to a feasible and workable size; e.g., the values are primarily positive; lie in a limited range of number of digits; and are used only for display, comparison, or sorting (and sorting's companion processes ordering and collating), and/or; operate arithmetically only upon each other (and only for addition and subtraction, never for multiplication or or division).

This invention solves much if not all of the millennium problem in computer programs. Its essence is that the special properties of "Year Arithmetic" will aid recognition (and thereby correct usage) of year values, and that it is possible to provide certain subsets of the coded character set of an object program with an alternate or second attribute, or meaning. Thus selected subsets of 8-bit octets (bytes) of the coded character sets in current usage are enabled to have dual attributes; a) their original graphic or control attribute in ASCII or EBCDIC (such as a capital "Q"), and b) a second or alternate attribute such as digits with added meaning or definition. Such a second attribute of a character of a selected subset of the coded character set of a program is made relevant, or active, when used as an operand of certain arithmetic and data input and output operations as distinguished in actual usage; otherwise its original, or primary, attribute is relevant, or active.

This distinction is made unambiguously via the operation code of instructions that apply to, or reference, operands which contain any of the characters of such a selected subset of characters. E.g., dualities of attributes and usage can be completely insulated, one from the other, in actual operation. If the operation code signifies an arithmetic operation, and if the specified operands contain any of the characters of a selected subset of such characters, those characters are converted (outside the main flow of instructions) and expanded (prior to actual arithmetic operation) to a form that the arithmetic registers of the computer system executing the program can handle. Results of the arithmetic operations are then converted to include a character of the selected subset before storage or other use.

In particular, a character of a selected subset whose second attribute is relevant, is hereafter called a "Bemer digit" (or "Bigit" for short) when used for other than graphic or control purposes. A Bigit can be considered as being composed of a 4-bit hi zone and a 4-bit lo zone, with the 4 lo zone bits representing, or meaning, for example, the numbers 0–9, and with the 4 hi zone bits representing, or meaning, something auxiliary to the meaning of the lo zone bits. In particular, the prefixes, or hi zone bits, of a Bigit in the high order, or decade, position of a year value may stand for millennium-century values. Thus one Bigit, a Y-Bigit, can by itself represent 3 digits M, C and D while the digit character of lower order, normally to the right of the Bigit, represents the year of the decade Y. Thus, with a Y-Bigit occupying the decade position of an operand defining M, C, and D of a year value, two characters—one a Y-Bigit and the second a digit character whose original and sole attribute is that of a digit, can represent a 4-digit year value in an object program while occupying only two bytes as before.

Moreover, a Bigit in the units position of a number field (an I-Bigit) will indicate, by its hi zone bits, that the number is a year increment value that will be added to, or subtracted from, year values. Such year increment values will seldom be more than two digits in length, and this property is also of use.

The import of this invention is evident by noting that almost all existing object code programs work on year value fields of only two digit characters, and the insertion of two more to make 4-digit year values would throw all data referencing and instruction jumps out of alignment and destroy the working of a program by increasing to four the number of bytes needed to define 4-digit year values.

This invention provides a method whereby year and year increment values can be marked as such during their input phase, utilizing the millennium and century digit characters of 4-digit year values to select the marking of the decade digit character into a Y-Bigit, or the marking of the units digit character of a number field, known to to be a year increment value, into a I-Bigit. These markings, i.e., different hi zone bits of a character, because they are not standard for digit characters, identify such entry data as belonging to that particular class consisting ONLY of year and year increment values.

Without any other part of this invention, such marking would still be an effective diagnostic tool to pinpoint other year values in memory, and would be an aid to other methods of compensating for the imminence of the use of 4-digit year values with explicitly different millennium and century values. This property of alternate attributes for selected subsets of characters of a coded character set adheres to such characters much as a dye would. It is the only instance where internal data of an application program is self-identifying as to type, or meaning, when taken in consideration with instructions that will apply to them. This property is unique.

Moreover, this "dye-like" property of selected subsets of characters of the coded character set of a program can be passed on to other data currently stored in the memory of a computer system without such attributes, when it is found that, in actual arithmetic operations of an extremely limited subset of such operations, such digit characters also (by the rules of "year arithmetic") must be year or year increment values. These data may then also be marked similarly, thus in the process of actual operations identifying them also as such, just as though they were input via the new system.

Arithmetic operations by currently available computer systems may not now be applied to operands that contain Bigits. Arithmetic registers of existing computer systems are probably all incapable of processing operands that include a Bigit. The presence of a Bigit would cause a fault and/or a halt in operations. Indeed this is a beneficial property, as such faults and/or halts would expose any overlooked conversions.

Thus replacement arithmetic processes must be built. These have been devised; they are constructed by a text processing program that automatically examines all object code of an application program to find candidate instructions, replacing each such instruction by a jump-return instruction to a replacement subroutine called a "ReSub". Further, a ReSub can be deleted to restore that part of the object program to its initial state if, after some elapsed time period, no action involving a Bigit has occurred in it. Lack of action would mean that the operands involved, although meeting enough criteria to be suspected as "year arithmetic" operands, were not actually such.

For computer systems where decimal arithmetic is executed upon operands in the packed decimal and sign form, the hi zone of the Y-Bigit, hereafter a B-zone, is moved to the sign position of the operand. Similar restrictions and solutions by ReSubs apply.

All characters of selected characters sets created under this invention have been carefully devised so that normal sorting, ordering, and collating processes will work correctly, exactly as if the data had been in full 4-digit character form.

Methods are given to convert Y-Bigits to their full or expanded form for all methods of output, visual, printed, and intersystem transfer.

An alternate method for displaying Bigits to identify their second attribute without expansion is to provide auxiliary graphic properties corresponding to the hi zone bits of a Y-Bigit. A graphic property, e.g., is an underline of the decade digit where the hi zone bits indicate a millennium-century value of 19, and an overline of the decade digit when hi zone bits indicate a millennium-century value of 20.

To provide coexistence with programs where year values are given as four digit characters of the character set of the program, year data of this form can be marked, or identified, by converting the millennium digit character to a Bigit. These markings, utilized or ignored, would still be vital to intra- (and inter-) system working.

It is therefore an object of this invention to provide a subset of characters of the coded character set of such systems with a second attribute, which second attribute becomes relevant or is used under certain predetermined circumstances.

Another object of this invention is to provide a method, for solving the millennium problem in application programs of digital computer systems, that can be implemented quite quickly and easily so that this problem can be solved well before the year 2000 AD.

DESCRIPTION OF THE PREFERRED EMBODIMENT

Figure 1:
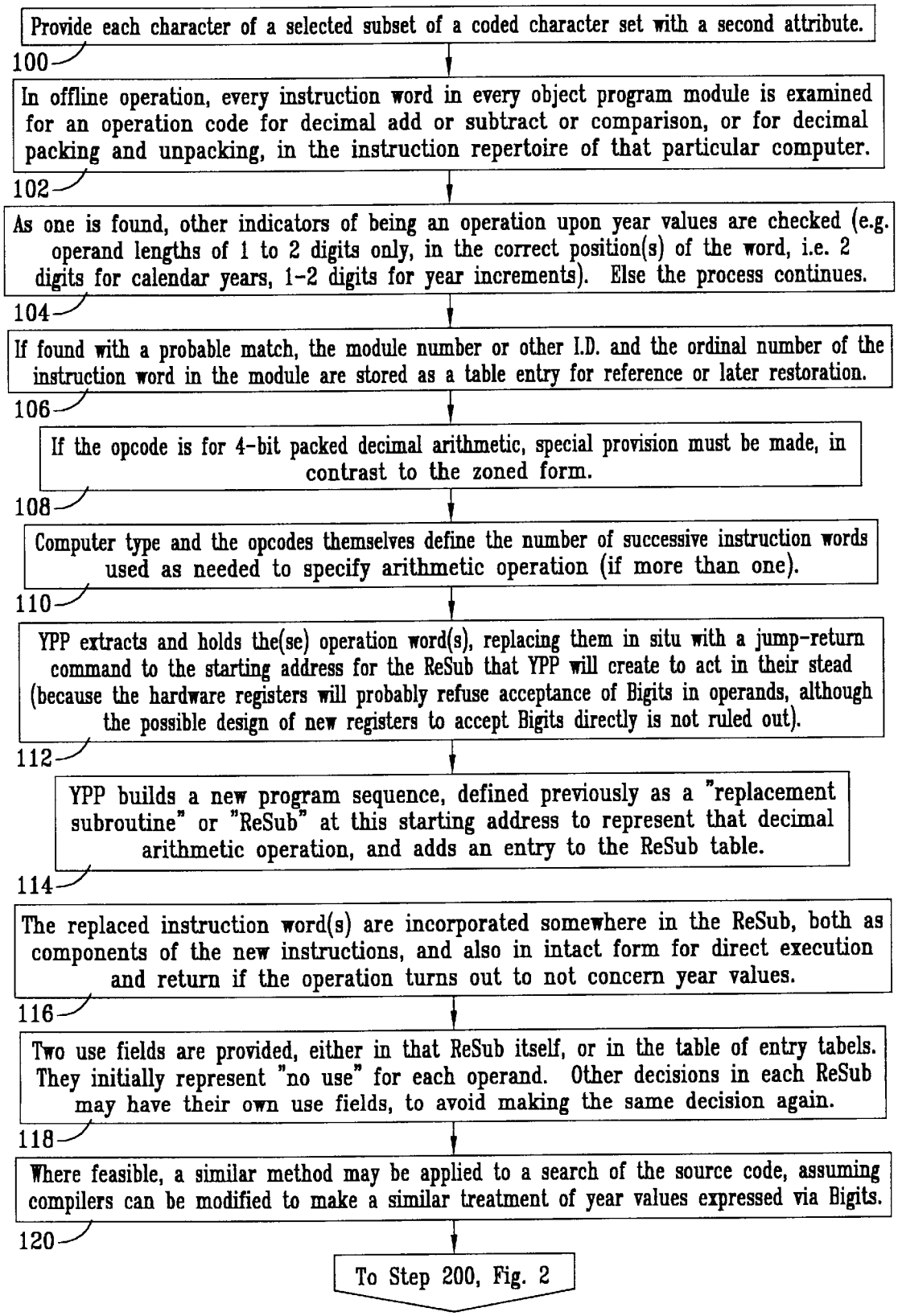
FIG. 1 is a flow chart illustrating a preferred method for generally implementing a preliminary operation of the present invention.

The two major coded character sets in broad usage by the computer industry are ASCII (American Standard Code for Information Interchange), a worldwide standard that is also the internal code of personal computers, and EBCDIC (Extended Binary Coded Decimal Interchange Code), a code proprietary to the IBM Corporation, which is the internal code of IBM mainframe computers and of IBM-compatible computers manufactured by others.

Both sets are constructed of characters defined by 8 bits each, each octet (byte) being divisible into two zones, the zone including the lower order four bits being the "lo zone" or "lo zone bits", with the higher order four bits being the "hi zone", or the "hi zone bits" of the byte. The 8 bits of a byte provide 256 distinct, or separate, combinations or characters or attributes. The contents of of both sets are usually displayed as a 16 by 16 matrix, with the vertical dimension being the 16 combinations of the lo zone bits, and the horizontal dimension being the 16 combinations of the hi zone bits. Such a matrix is set forth in Table 1 below:

TABLE 1

Standard Assignment for ASCII and EBCDIC Digits

```
            0 0 0 0 0 0 0 0 1 1 1 1 1 1 1 1
            0 0 0 0 1 1 1 1 0 0 0 0 1 1 1 1
            0 0 1 1 0 0 1 1 0 0 1 1 0 0 1 1
            0 1 0 1 0 1 0 1 0 1 0 1 0 1 0 1
0 0 0 0           0                         0
0 0 0 1           1                         1
0 0 1 0           2                         2
0 0 1 1           3                         3
0 1 0 0           4                         4
0 1 0 1           5                         5
0 1 1 0           6                         6
0 1 1 1           7                         7
1 0 0 0           8                         8
1 0 0 1           9                         9
1 0 1 0
1 0 1 1         ASCII                     EBCDIC
1 1 0 0
1 1 0 1
1 1 1 0
1 1 1 1
```

Both ASCII and EBCDIC include representation for the decimal digits 0 through 9, where, in both sets, the lo zone bits have the binary value of a digit; thus lo zone bits 1001 for 9, and lo zone bits 0100 for 4. The hi zone bits of a byte for a digit have different values, being 0011 for ASCII and 1111 for EBCDIC. Thus the selection of value of the hi zone bits for decimal digits was arbitrary among the 16 possible hi zone values. In practice, columns 0 and 1 are reserved for characters having control meanings, leaving 14 columns for characters with graphic symbol meanings.

In an early version of ASCII the byte size was 7, not 8. This allowed most punctuation, arithmetic operators and two forms, upper and lower case, of the Latin alphabet. For any computers operating with such a 7-bit byte, only columns 3, 5, and 8 may be reassigned.

In ASCII and EBCDIC each and every character is assigned to one position in its matrix, and each of the 256 possible characters of a code set has a unique attribute value, or meaning. This invention departs from this practice, in that a character, position, or byte, may be assigned a second, or alternative, attribute or meaning, such as three digits, for example. Thus as depicted by step 100 of the chart shown in FIG. 1, this invention teaches assigning alternative attributes or meanings to selected subsets or groups of 10 characters. Characters of each such group retain their original meanings except when used to represent the year portion of a date or a year increment. These six groups are found in the fifth through tenth columns of the matrix of Table 2 on page 14, the hi zone bits of which are 0100, 0101, 0110, 0111, 1000 and 1001 respectively, and the lo zone bits of which are those of the binary equivalents for each of the digits 0–9.

Elaborating the "Bemer digit" (for economy called a "Bigit", not to be confused with "Bit", as derived from "Binary digit"), a Bigit is any 7- or more-bit character used for decimal arithmetic (though other uses arise), of which the lo zone bits specify 0–9, and the hi zone has any bit combination other than those of the standard digit characters of ASCII and EBCDIC.

In ASCII, most but not all of the coded combinations for the hi zones of 0100, 0101, 0110, and 0111 have the assigned primary class attribute of "alphabet" components, having corresponding graphic symbols for the letters.

Although often seen placed in the higher portion of the chart, other alphabets such as the Cyrillic alphabet could also be assigned in those same columns in place of the Roman alphabet.

The principle of this existing method of font change is that it is done by explicit and overt nomination, in time, by submitting to some recognizer the escape sequence registered to Cyrillic alphabet. Thus time is the governing factor. The question would be "Is it now before or after the time that the escape sequence for Cyrillic put that alphabet into force?" This is how laser printers change fonts.

The Bigit principle differs. The alternation of attribute meaning is switched implicitly, not explicitly. That is, there is no overt switching action. Rather the switch is made instantly, at any time, by virtue of the distinctions in usage made by the instruction operators and the operand characteristics.

E.g., if addition is applied to an operand which is a group of characters, of which one might usually be considered a lower case "q", it is recognized that one does not (except in cipher puzzles) add a letter to get a numeric answer, and therefore the "q" could well be a Bigit representing the decade of the 1810's.

However, if the rules of present operation state that Bigits are restricted to representation of multidigit years or year increments, then an operand of more than two digits will not be permitted this implicit switch, and the customary faults will occur.

And, if that "q" existed in the rightmost position of the operand, it wouldn't even be the 1810's decade. A fault would occur instead, for the only Bigits permitted to act as such in the units position are those indicating a year increment, which are limited to I-Bigits with hi zone of 0100 (whose primary ASCII attribute is being the "at" symbol and the upper case letters "A" through "I").

For the millennium-solving aspect of this invention there are two classes of Bigits—"MCD" Bigits, which must occur only in the tens (decade) position of a year value (and of which 50 are assigned so far), and "Increment" Bigits, which must occur only in the units position of a year increment value (of which 10 are assigned).

The hi zone of a Bigit will be hereafter called a "B-zone" when part of a full byte, and a "B-sign" when put into the sign position of a packed decimal number.

Understanding what follows depends upon the agreed notation:

M=8-bit character for a millennium digit
C=8-bit character for a century of millennium digit
D=8-bit character for a decade of century digit
Y=8-bit character for a year of decade digit
B=8-bit Bigit character for either decade or year
d=4-bit group for decade of century
y=4-bit group for year of decade
s=4-bit B-sign in the packed decimal sign position Revised entry control routines provide the indication of millennium and century (MC) of 2-digit calendar year values by replacing the hi zone of D with:

0101 (years 16DY)   0111 (years 18DY)   1001 (years 20DY)
0110 (years 17DY)   1000 (years 19DY)

making D into a Y-Bigit. This choice permits fields with year values to be ordered (collated) by direct binary comparison, and altered to four-digit-character form only when subject to a decimal arithmetic operation, or upon output display or data transfer. Choices for the 60 Bigits show as blocks in Table 2 following, the Increment Bigits having the zone 0100, the MCD Bigits having zones 0101 through 1011:

TABLE 2

ASCII and EBCDIC Digits and Millennium-Century Bigits

```
          0 0 0 0 0 0 0 0 1 1 1 1 1 1 1 1
          0 0 0 0 1 1 1 1 0 0 0 0 1 1 1 1
          0 0 1 1 0 0 1 1 0 0 1 1 0 0 1 1
          0 1 0 1 0 1 0 1 0 1 0 1 0 1 0 1
0 0 0 0   0 ▪ ▪ ▪ ▪ ▪ ▪ ▪                 0
0 0 0 1   1 ▪ ▪ ▪ ▪ ▪ ▪ ▪                 1
0 0 1 0   2 ▪ ▪ ▪ ▪ ▪ ▪ ▪                 2
0 0 1 1   3 ▪ ▪ ▪ ▪ ▪ ▪ ▪                 3
0 1 0 0   4 ▪ ▪ ▪ ▪ ▪ ▪ ▪                 4
0 1 0 1   5 ▪ ▪ ▪ ▪ ▪ ▪ ▪                 5
0 1 1 0   6 ▪ ▪ ▪ ▪ ▪ ▪ ▪                 6
0 1 1 1   7 ▪ ▪ ▪ ▪ ▪ ▪ ▪                 7
1 0 0 0   8 ▪ ▪ ▪ ▪ ▪ ▪ ▪                 8
1 0 0 1   9 ▪ ▪ ▪ ▪ ▪ ▪ ▪                 9
1 0 1 0
1 0 1 1   ASCII                      EBCDIC
1 1 0 0
1 1 0 1
1 1 1 0
1 1 1 1
```

The block characters in Table 2 indicate the domain of Bigits—the positions or characters preempted for arithmetic and data output use only, to which this method applies.

Year increment values are given the extra indication of use as a year element by a hi zone value of 0100 in the least significant 8-bit character, which converts it also to a Bigit used in year increments, or an I-Bigit. One of the six hi zone values 0100 to 1001 will all occupy the sign position when an operand is in the B-sign version of packed decimal form, hereinafter called "modified packed decimal form". Thus the above choices were made deliberately so that the adjoinder of all yields a unique set, members of which are, moreover, all illegal sign values for all systems using IBM-type packed decimal arithmetic.

Much data is entered from dumb terminals or personal computers, either in response to queries or from fields of a displayed form. It is common practice to control the content, type, or set of data allowed to be entered. Such control may be exercised by microprogram (dumb terminals), by personal computer programs, or by programs residing in the host computer that will use the data. Entry data may also come from special readers, but even these may be modified similarly. E.g., a credit card reader does not read the year as embossed on the plastic, but rather the magnetic strip, for which recording and reading routines may be modified without difficulty. Thus intelligent control of data entry is an established fact, in either the input device itself, or in the computer receiving data from the input device. The screening actions are specific to each of the input fields.

The pattern of entry control is such that, if the entered data fails to meet defined criteria, reentry of the data is asked. Examples of such control are:

An entry field must be filled with digits only. If any characters other than digits are entered, they are refused, and the entry offer is made again.

A name field may consist of only alphabetic characters and a subset of special characters. Entering a dollar sign, for example, would cause rejection and require reentry.

An entry field is limited to a known set of values. Entry of a value not known to the entry device is rejected.

One can add to or alter existing controls for screening input of year elements, both calendar and increments, to make them include a Bigit. However, Bigits may not work as is in arithmetic operations, but may be converted to data forms the arithmetic registers of the computer can handle, via subroutines, microcoding, or specially-designed chips. So altered, they may be stored in computer memory or auxiliary storage devices. However, in altered form, they will be used only in decimal arithmetic or some methods of display.

This invention depends upon:

Having all new input of year values arrive in full 4-digit form, such values being converted to a Y-Bigit in the tens position prior to use by the object program (the primary guarantee for the operation of existing object code without disruption).

Having all new input of year increment values arrive in full form, being converted to I-Bigit form in the units position to indicate that it is a year increment value.

Modifying the object program so that it can operate with year and year increment values that include Bigits or B-signs in the modified packed decimal format.

It follows that entry fields for data elements "year" and "year increment" may have their controls altered. Types of control for implicit calendar year could be:

1) The entry field is always for a 20th century date. The entry field says so. Or else a 21st century date.
2) The "19" or "20" may be defined automatically by the internal clock, or picked up automatically from some fixed prestored field.

Types of control for implicit calendar year with a barely modifiable form are:

3) Abbreviate existing labels in that line to gain space.
4) Augment the operator's instructions to say "19xx assumed—see supervisor for 20xx dates".

Types of control for explicit calendar year entry, modifying the form by the enlargement of year entry fields, are:

5) The entry field contains a fixed display of "19" or "20".
6) Replicate the entry field in a second (adjacent) position. The original entry field has a fixed display of "19", the replica a fixed display of "20". The entry person selects one or the other field to enter the rest of the date. Entry in both is rejected.
7) Add two more positions for century. The entry routine can accept only "19" or "20" in those positions. This is the preferred method for this invention.
8) Add two more positions for century. The entry routine will accept any values from "16" through "20" for these positions, and will pass those values through to the computer intact for programs (new or old) successfully adapted to operating upon 4-digit year forms.

Permissible Arithmetic Operations Upon Year Values

In Table 3 are shown all combinations of arithmetic that may be performed upon calendar year and year increment values, to show how, in every case, already stored data may be identified as similar values, by virtue of single arithmetic interaction with another operand already thus identified. Every operand prefixed "MCD" includes a MCD or Y-Bigit carrying the millennium-century indicator.

TABLE 3

All Possible Combinations of Year Arithmetic

| Case | Operand A | OP | Operand B | Yielding |
|---|---|---|---|---|
| 1 | MCD year | – | MCD year | year increment |
| 2 | MCD year | – | year | year increment |
| 3 | year | – | MCD year | year increment |
| 4 | year | – | year | year increment |
| 5 | MCD year | + – | MCD year increment | year |
| 6 | MCD year | + – | year increment | " |
| 7 | year | + – | MCD year increment | " |
| 8 | year | + – | year increment | " |
| 9 | MCD year increment | + | MCD year | " |
| 10 | MCD year increment | + | year | " |
| 11 | year increment | + | MCD year | " |
| 12 | year increment | + | year | " |
| 13 | MCD year increment | + – | MCD year increment | year increment |
| 14 | MCD year increment | + – | year increment | year increment |
| 15 | year increment | + – | MCD year increment | year increment |
| 16 | year increment | + – | year increment | year increment |

All cases which appear indeterminant, without "MCD", can be made determinant whenever "MCD" forms a Bigit during input. But assume that Operand B is already stored and lacks an MCD indicator. Then if Operand A is also already stored and also lacks an MCD indicator, little salvage is possible; but one must assume that any calculation to be made between them has already occurred.

However, doing so requires that all arithmetic operations where one of the operands consists of two bytes, one byte of which is a Y-Bigit, will have to be modified to produce the proper result operand in the proper format for storage. As set forth below, the result operand is compressed to two bytes for storage in memory. Similarly any data operation that outputs two bytes representing two decimal digits will have to be checked to determine if one of the bytes is a Y-Bigit. If it is, the data output will be converted to 4 decimal digits representing MCDY (for a Y-Bigit in the tens position) or a year increment value (for a I-Bigit in the units position).

With respect to arithmetic operations, those of interest are only decimal arithmetic operations in which one of the operands consists of two digits, sometimes referred to as decimal digits. It must be noted that not all types of decimal arithmetic operations have any likelihood of being used to produce a result operand that is the year portion of a date. Such decimal arithmetic operations involving two operands, at least one of which must consist of two decimal digits, are best found by offline computerized search of the object code program to be modified, via a text processing program. Clues to finding such operations are the operation codes and operand length indicators of each such computer's instruction repertoire.

With respect to each of these decimal arithmetic operations, a subroutine is installed which temporarily extracts and holds the successive instructions required to perform the arithmetic operation and replaces the extracted instructions with a jump-return (Note: also termed "branch" and "transfer" in many computers) command to a starting address of the subroutine. Beginning at this address is a new sequence to fetch the operands defined by their addresses in the original command. Both operands are checked by a checking sequence to see if either or both includes a Bigit. If none is found, then a jump to a portion of the sequence which is identical to the original command is executed. After execution, the jump's return command is executed so that the object program is back where it would have been without the interrupt. If one or both operands include a Bigit, an unpacking program is executed to convert each operand, of which one byte is a Bigit and the other that of the coded character set of the program for a decimal digit, to a format acceptable for decimal arithmetic operations.

With respect to programs using ASCII coded characters, this would be four bytes—one each for M, C, D, and Y. The specified arithmetic operation is then performed on the operands, at least one of which is an unpacked operand of four digit characters. If the result is four decimal digit characters, the most significant digit of which has a value of 1 or 2, and the next most significant digit has a value of 9 or 0, together defining "19" and "20", the four-digit result operand is operated upon by a packing program that converts the result to a two-byte result, one of which is a Y-Bigit. The packed result is then stored where the original result would have been stored, and the jump's return is executed.

The subroutine includes a use field which initially has a value denoting "no use". If the checking sequence detects that one of the two bytes of an operand of the arithmetic operation is a Bigit, the value of the use field is changed to "use". Once the use field has been changed to indicate that a Bigit has been detected, the test for a Bigit in one of the operands is not invoked because it is known that one will be present.

Preparing for Operation

There are, in every make of computer, operation codes for plain decimal arithmetic. Such codes may be found by a text search of object programs with products such as "SuperZap", an IBM program, and "TEX", a Bull HN program, e.g. This search is part of a process which scans and modifies the object program so that it can operate freely upon both year increments and calendar year values from 1600 through 2099 with NO object program modification other than those replacements automatically created by this program, called here "YPP", or "Year 2000 Preparation Program". Its functions are to:

Find, by examining the object program with a program written in the text processing language, all operations that could possibly be operations for year arithmetic, according to the limiting rules.

Create a Replacement Subroutine ("ReSub") for each of those operations, invoked by jump-return commands in situ.

Thus modify the object code.

With reference to the flow chart shown in FIG. 1, subsequent to the step 100 described above wherein a selected subset of a coded character set is provided with a second attribute, YPP operates more specifically in the following manner:

Step 102 In offline operation, every instruction word in every object program module is examined for an operation code for decimal add or subtract or comparison, or for decimal packing and unpacking, in the instruction repertoire of that particular computer.

Step 104 As one is found, other indicators of being an operation upon year values are checked (e.g. operand lengths of 1 to 2 digits only, in the correct position(s) of the word; i.e., 2 digits for calendar years, 1–2 digits for year increments). Else the process continues. (Note: The possibility of 3-digit year increments can be provided for in the future, but it is a certainty that they do not exist in present programs, else these would have failed at such a point.)

Step 106 If found with a probable match, the module number or other I.D. and the ordinal number of the instruction word in the module are stored as a table entry for reference or later restoration.

Step 108 If the opcode is for 4-bit packed decimal arithmetic, special provision must be made, in contrast to the zoned form.

Step 110 Computer type and the opcodes themselves define the number of successive instruction words used as needed to specify arithmetic operation (if more than one).

Step 112 YPP extracts and holds the(se) operation word (s), replacing them in situ with a jump-return command to the starting address for the ReSub that YPP will create to act in their stead (because the hardware registers will probably refuse acceptance of Bigits in operands, although the possible design of new registers to accept Bigits directly is not ruled out).

Step 114 YPP builds a new program sequence, defined previously as a "replacement subroutine" or "ReSub", at this starting address to represent that decimal arithmetic operation, and adds an entry to the ReSub table, which might look like:

| RS # | Process Module ID | Address of first word | Jump word is nth word | Op A use | Op B use | Test yes use |
|------|-------------------|----------------------|----------------------|----------|----------|--------------|
| 1    |                   |                      |                      |          |          |              |
| 2    |                   |                      |                      |          |          |              |
| ...  |                   |                      |                      |          |          |              |

Step 116 The replaced instruction word(s) are incorporated somewhere in the ReSub, both as components of the new instructions, and also in intact form for direct execution and return if the operation turns out to not concern year values.

Step 118 Two use fields are provided, either in that ReSub itself, or in the table of entry labels. They initially represent "no use" for each operand. Other decisions in each ReSub may have their own use fields, to avoid making the same decision again.

Step 120 Where feasible, a similar method may be applied to a search of the source code, assuming compilers can be modified to make a similar treatment of year values expressed via Bigits.

Figure 2:
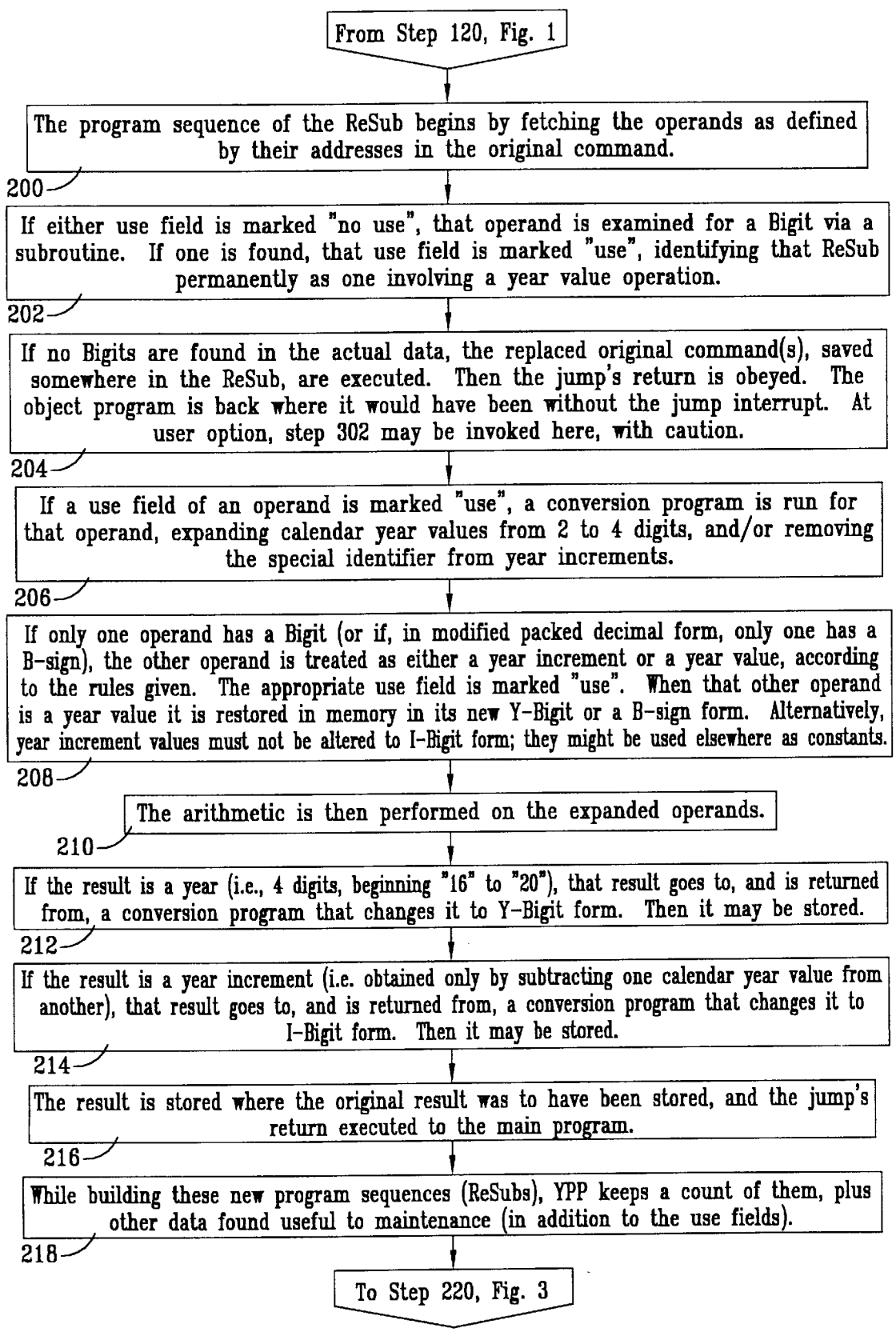
FIG. 2 is a flow chart illustrating a preferred method for generally implementing a operation of the present invention.

In Operation (FIG. 2)

Step 200 The program sequence of the ReSub begins by fetching the operands as defined by their addresses in the original command.

Step 202 If either use field is marked "no use", that operand is examined for a Bigit via a subroutine. If one is found, that use field is marked "use", identifying that ReSub permanently as one involving a year value operation.

Step 204 If no Bigits are found in the actual data, the replaced original command(s), saved somewhere in the ReSub, are executed. Then the jump's return is obeyed. The object program is back where it would have been without the jump interrupt. At user option, step Step 302 may be invoked here, with caution!

Step 206 If a use field of an operand is marked "use", a conversion program is run for that operand, expanding calendar year values from 2 to 4 digits, and/or removing the special identifier from year increments. The test for Bigits, including B-signs, is not invoked because it is known they will be present.

Step 208 If only one operand has a Bigit (or if, in modified packed decimal form, only one has a B-sign), the other operand is treated as either a year increment or a year value, according to the rules given. The appropriate use field is marked "use". When that other operand is a year value it is restored in memory in its new Y-Bigit or B-sign form. Alternatively, year increment values must not be altered to I-Bigit form; they might be used elsewhere as constants.

Step 210 The arithmetic is then performed on the expanded operands.

Step 212 If the result is a year (i.e., 4 digits, beginning "16" to "20"), that result goes to, and is returned from, a conversion program that changes it to Y-Bigit form. Then it may be stored.

Step 214 If the result is a year increment (i.e., obtained only by subtracting one calendar year value from another), that result goes to, and is returned from, a conversion program that changes it to I-Bigit form. Then it may be stored.

Step 216 The result is stored where the original result was to have been stored, and the jump's return executed to the main program.

Step 218 While building these new program sequences (ReSubs), YPP keeps a count of them, plus other data found useful to maintenance (in addition to the use fields).

Step 220 This body of new code (the ReSub routines), because it will contain the replaced instructions themselves, will not be subjected to its own process. As this statement may not be obvious, consider that such action could be recursive ad infinitum.

Figure 3:
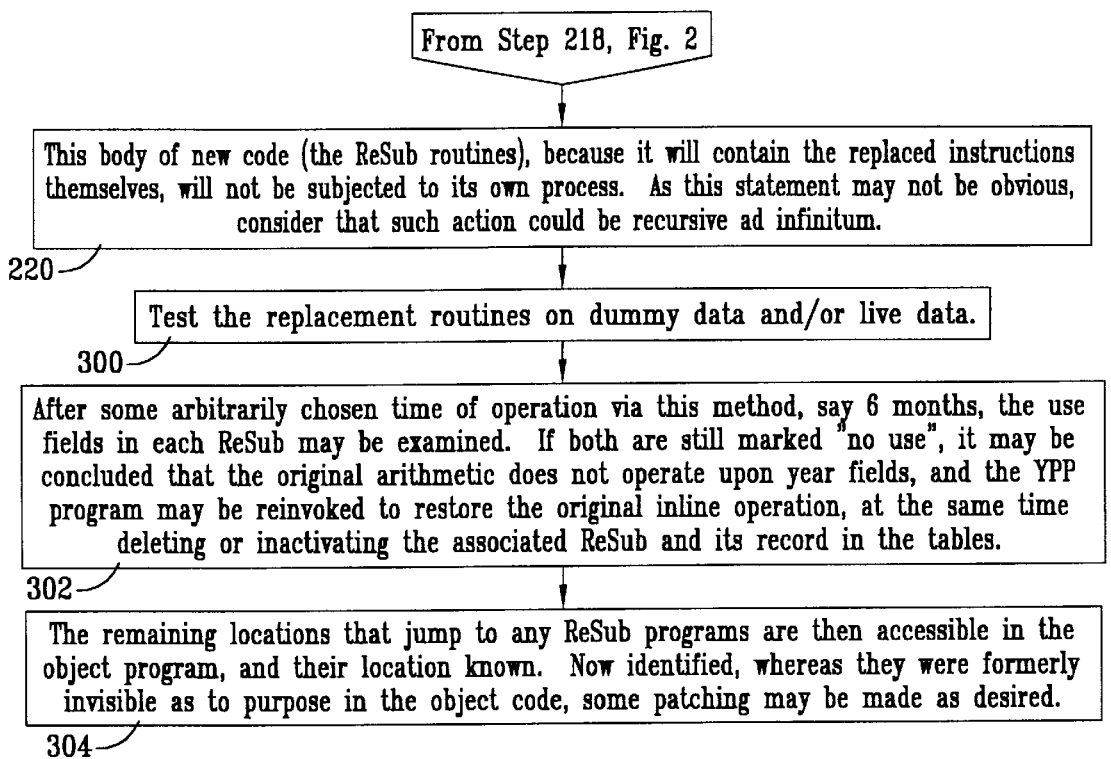
FIG. 3 is a flow chart illustrating a preferred method for generally implementing a post operation of the present invention.

Post Operation (FIG. 3)

Step 300 Testing of these replacement routines, on dummy or live data or both, is mandatory.

Step 302 After some arbitrarily chosen time of operation via this method, say 6 months, the use fields in each ReSub may be examined. If both are still marked "no use", it may be concluded that the original arithmetic does not operate upon year fields, and the YPP program may be reinvoked to restore the original inline operation, at the same time deleting or inactivating the associated ReSub and its record in the tables.

Step 304 The remaining locations that jump to any ReSub programs are then accessible in the object program, and their location known. Now identified, whereas they were formerly invisible as to purpose in the object code, some patching may be made as desired.

Limiting the Number of ReSubs

How much the YPP process adds to program size will depend upon how many such opcodes are found (but see 23 supra), and upon clever usage in parameterizing generation of the new program sequences, possibly via indirect addressing. Indeed, this can be very clever, for only ONE SUCH YPP need be written for each computer type. Even then the principle or algorithm remains unchanged. Moreover, some intelligent design may lead to doing it all by tables!

These new ReSubs can be stored in memory known to be spare, or else in a special memory fabricated for the purpose.

Steps 1) and 2) gave general limitations on what operations and what operand sizes limit qualification for a ReSub. More explicit and definitive rules are now given, because programs must depend on explicit instructions, not generalities.

The following tables (4a, 4b, 4c, and 4d) summarize permissible, impermissible, and dangerous arithmetic operations between:

1) C—unmarked constants
2) I—marked year increments, and
3) YY—unmarked calendar year values
4) BY—marked calendar year values
5) YYYY—unmarked 4-digit calendar year values
6) BYYY—marked 4-digit calendar year values The tables were made by taking all possible combinations of these six types, combinations of being first or second operand, combinations of being input or already in memory (store), and for each of the four arithmetic operators. They were built exhaustively first, then reduced by the commutative property of add and multiply, and reduced further by eliminating duplicate and illegal conditions. The tables may be reverified by repeating the process of building the exhaustive table and reducing it. Containing all the rules for building replacement subroutines (ReSubs), they are grouped by arithmetic operation, and the legal operations shown are the basis and justification for Table 3, page 18.

Limits to Decimal Arithmetic upon Year Values

In the tables, the case tag signifies:

TABLE 4a

Subtraction Operations

| Case | | Notes |
|---|---|---|
| 1a -- | C - C = C | 1 |
| 2a -- | C - I = I | 12 |
| 1b -- | I - C = I | 2 |
| 2b -- | I - I = I | 2 |
| 1c i- | YY - C = YY | 6,4 |
| 1c s- | YY - C = YY | 3 |
| 1d -i | BY - C = BY | 4 |
| 1d -s | BY - C = BY | |
| 1e ii | YYYY - C = YYYY | 6,4 |
| 1e is | YYYY - C = YYYY | 6 |
| 1f -i | BYYY - C = BYYY | 4 |
| 1f -s | BYYY - C = BYYY | |
| 2f -- | BYYY - I = BYYY | |
| 2c i- | YY - I = BY | 6 |
| 2c s- | YY - I = BY | 7 |
| 2d -- | BY - I = BY | |
| 2e i- | YYYY - I = BYYY | 6 |
| 2e s- | YYYY - I = BYYY | 9 |
| 3a -- | C - YY = NG | 14 |
| 3b -- | I - YY = NG | 14 |
| 4a -- | C - BY = NG | 14 |
| 4b -- | I - BY = NG | 14 |
| 5a -- | C - YYYY = NG | 14 |
| 5b -- | I - YYYY = NG | 14 |
| 6a -- | C - BYYY = NG | 14 |
| 6b -- | I - BYYY = NG | 14 |
| 3c -- | YY - YY = nn | 3 |
| 3d -i | BY - YY = nnnn | 6 |
| 3d -s | BY - YY = nnnn | 7 |
| 3e ii | YYYY - YY = nnnn | 6 |
| 3e is | YYYY - YY = nnnn | 6,7 |
| 3e s- | YYYY - YY = nnnn | 9 |

TABLE 4a-continued

Subtraction Operations

| Case | | Notes |
|---|---|---|
| 3f -i | BYYY − YY = nnnn | 6 |
| 3f -s | BYYY − YY = nnnn | 7 |
| 4f -- | BYYY − BY = nnnn | |
| 4c i- | YY − BY = nnnn | 6 |
| 4c s- | YY − BY = nnnn | 7 |
| 4d -- | BY − BY = nnnn | |
| 4e i- | YYYY − BY = nnnn | 6 |
| 4e s- | YYYY − BY = nnnn | 9 |
| 5c -i | YY − YYYY = nnnn | 6 |
| 5c -s | YY − YYYY = nnnn | 9 |
| 5d -i | BY − YYYY = nnnn | 6 |
| 5d -s | BY − YYYY = nnnn | 9 |
| 5e -- | YYYY − YYYY = nnnn | 9 |
| 5f i- | BYYY − YYYY = nnnn | 6 |
| 5f -s | BYYY − YYYY = nnnn | 9 |
| 6c i- | YY − BYYY = nnnn | 6 |
| 6c s- | YY − BYYY = nnnn | 7 |
| 6d -- | BY − BYYY = nnnn | |
| 6e i- | YYYY − BYYY = nnnn | 6 |
| 6e s- | YYYY − BYYY = nnnn | 9 |
| 6f -- | BYYY − BYYY = nnnn | |

"ii" both operands as input;
"is" first operand as input, the second in memory;
"si" first operand in memory, the second as input;
"ss" both operands as already in memory;
"-i" "-s" first operand as either input or in memory;
"i-" "s-" second operand as either input or in memory;
"--" both operands as either input or in memory.

TABLE 4b

Addition Operations

| Case | | Notes |
|---|---|---|
| 1a -- | C + C = C | 1 |
| 1e -- | YYYY + C = nnnn | 1 |
| 5a -- | C + YYYY = nnnn | 1 |
| 1b -- | I + C = I | 2 |
| 2a -- | C + I = I | 2 |
| 2b -- | I + I = I | 2 |
| 1c -- | YY + C = YY | 3 |
| 1d -i | BY + C = BY | 4 |
| 1d -s | BY + C = BY | |
| 1f -i | BYYY + C = BYYY or BY | 4,5 |
| 1f -s | BYYY + C = BYYY or BY | 5 |
| 2c i- | YY + I = BY | 6 |
| 2c s- | YY + I = BY | 7 |
| 2d -- | BY + I = BY | |
| 2e i- | YYYY + I = BYYY or BY | 6,5 |
| 2e s- | YYYY + I = BYYY | 9,8 |
| 2f -- | BYYY + I = BYYY or BY | 5 |
| 3a -- | C + YY = YY | 3 |
| 3b -i | I + YY = BY | 6 |
| 3b -s | I + YY = BY | 7 |
| 4a i- | C + BY = BY | 4 |
| 4a s- | C + BY = BY | |
| 4b -- | I + BY = BY | |
| 5b -i | I + YYYY = BY | 6 |
| 5b -s | I + YYYY = BY | 9 |
| 6a i- | C + BYYY = BYYY or BY | 4,5 |
| 6a s- | C + BYYY = BYYY or BY | 5 |
| 6b -- | I + BYYY = BYYY or BY | 5 |
| 3c -- | YY + YY = NG | 10 |
| 3d -- | BY + YY = NG | 10 |
| 3e -- | YYYY + YY = NG | 10 |
| 3f -- | BYYY + YY = NG | 10 |
| 4c -- | YY + BY = NG | 10 |
| 4d -- | BY + BY = NG | 10 |
| 4e -- | YYYY + BY = NG | 10 |
| 4f -- | BYYY + BY = NG | 10 |
| 5c -- | YY + YYYY = NG | 10 |
| 5d -- | BY + YYYY = NG | 10 |
| 5e -- | YYYY + YYYY = NG | 10 |
| 5f -- | BYYY + YYYY = NG | 10 |
| 6d -- | BY + BYYY = NG | 10 |
| 6e -- | YYYY + BYYY = NG | 10 |
| 6f -- | BYYY + BYYY = NG | 10 |

TABLE 4c

Multiplication Operations

| Case | | Notes |
|---|---|---|
| 1a -- | C * C = C | 1 |
| 2a -- | C * I = I | 2 |
| 1b -- | I * C = I | 2 |
| 2b -- | I * I = NG | |
| 1c -- | YY * C = NG | 11 |
| 1d -- | BY * C = NG | 11 |
| 1e -- | YYYY * C = NG | 11 |
| 1f -- | BYYY * C = NG | 11 |
| 2c -- | YY * I = NG | 11 |
| 2d -- | BY * I = NG | 11 |
| 2e -- | YYYY * I = NG | 11 |
| 2f -- | BYYY * I = NG | 11 |
| 3a -- | C * YY = NG | 11 |
| 3b -- | I * YY = NG | 11 |
| 3c -- | YY * YY = NG | 11 |
| 3d -- | BY * YY = NG | 11 |
| 3e -- | YYYY * YY = NG | 11 |
| 3f -- | BYYY * YY = NG | 11 |
| 4a -- | C * BY = NG | 11 |
| 4b -- | I * BY = NG | 11 |
| 4c -- | YY * BY = NG | 11 |
| 4d -- | BY * BY = NG | 11 |
| 4e -- | YYYY * BY = NG | 11 |
| 4f -- | BYYY * BY = NG | 11 |
| 5a -- | C * YYYY = NG | 11 |
| 5b -- | I * YYYY = NG | 11 |
| 5c -- | YY * YYYY = NG | 11 |
| 5d -- | BY * YYYY = NG | 11 |
| 5e -- | YYYY * YYYY = NG | 11 |
| 5f -- | BYYY * YYYY = NG | 11 |
| 6a -- | C * BYYY = NG | 11 |
| 6b -- | I * BYYY = NG | 11 |
| 6c -- | YY * BYYY = NG | 11 |
| 6c -- | YY * BYYY = NG | 11 |
| 6d -- | BY * BYYY = NG | 11 |
| 6e -- | YYYY * BYYY = NG | 11 |
| 6f -- | BYYY * BYYY = NG | 11 |

TABLE 4d

Division Operations

| Case | | Notes |
|---|---|---|
| 1a -- | C / C = C | 1 |
| 1b -- | I / C = I | 2 |
| 1c -- | YY / C = NG | 15 |
| 1d -- | BY / C = NG | 15 |
| 1e -- | YYYY / C = NG | 15 |
| 1f -- | BYYY / C = NG | 15 |
| 2a -- | C / I = NG | 16 |
| 2b -- | I / I = NG | 16 |
| 2c -- | YY / I = NG | 16 |
| 2d -- | BY / I = NG | 16 |
| 2e -- | YYYY / I = NG | 16 |
| 2f -- | BYYY / I = NG | 16 |
| 3a -- | C / YY = NG | 16 |

TABLE 4d-continued

Division Operations

| Case | | Notes |
|---|---|---|
| 3b -- | I / YY = NG | 16 |
| 3c -- | YY / YY = NG | 16 |
| 3d -- | BY / YY = NG | 16 |
| 3e -- | YYYY / YY = NG | 16 |
| 3f -- | BYYY / YY = NG | 16 |
| 4a -- | C / BY = NG | 16 |
| 4b -- | I / BY = NG | 16 |
| 4c -- | YY / BY = NG | 16 |
| 4d -- | BY / BY = NG | 16 |
| 4e -- | YYYY / BY = NG | 16 |
| 4f -- | BYYY / BY = NG | 16 |
| 5a -- | C / YYYY = NG | 16 |
| 5b -- | I / YYYY = NG | 16 |
| 5c -- | YY / YYYY = NG | 16 |
| 5d -- | BY / YYYY = NG | 16 |
| 5e -- | YYYY / YYYY = NG | 16 |
| 5f -- | BYYY / YYYY = NG | 16 |
| 6a -- | C / BYYY = NG | 16 |
| 6b -- | I / BYYY = NG | 16 |
| 6c -- | YY / BYYY = NG | 16 |
| 6d -- | BY / BYYY = NG | 16 |
| 6e -- | YYYY / BYYY = NG | 16 |
| 6f -- | BYYY / BYYY = NG | 16 |

Notes for Tables of Limits to Decimal Arithmetic
1. Standard arithmetic, having nothing to do with year values.
2. Year increment values are subject to arithmetic operations, with obvious exceptions.
3. If in existing programs, over- or underflow may occur, often ignored, and a large source of present difficulties. Failure is likely, so it must be hoped that such operations have already occurred. Convert any value when it is determined.
4. Convert "C" at entry to "I" as defined by the other operand. But not in memory; C may have other uses as a constant.
5. Can make 2-B-digit or 4-B-digit values at option.
6. Convert "YY"/"YYYY" at entry to "BY"/"BYYY" if to be stored.
7. Convert "YY"/"YYYY" in memory to "BY". Defined as a calendar year by the other operand. May use "19" if YY>50, else "20".
8. Convert "YYYY" to "BYYY" in memory.
9. Probably means 4-digit-year working. Convert "YYYY" already in memory to "BYYY" only, to not destroy data addressing.
10. Two years are never added together; it is meaningless.
11. Calendar year values are never multiplied by ANYTHING!
12. Change sign and/or value of I.
13. Value of the result is meaningless, but its sign will tell which year is earlier or later.
14. Can only subtract years from other years.
15. Years are never divided by anything, even though "year+c" is divided in Julian day calculations.
16. Nothing may be divided by any year value or year increment.
17. In general, subtraction of year values may also have been programmed while adjoined to month and day values. But the operand lengths required will not meet the criteria.

Packed Decimal and the Millennium Problem

A very common line of 8-bit byte computer systems, i.e., IBM mainframe computers, has two forms of decimal numbers—1) zoned (EBCDIC form), and 2) packed decimal (PD). Decimal arithmetic is always done in PD format. In these systems, PD arithmetic operations work on numbers from 1 to 31 digits in length. The sign of the number resides in the rightmost quartet; i.e., the less significant part of the rightmost byte. Thus such numbers are constrained to odd integer lengths; for numbers of an even number of digits, the leftmost (most significant) quartet is preceded by a zero fill.

The digits taking but 10 of the 16 available combinations, the other 6 are illegal for decimal operations. The converse is true for the sign position. The high 6 positions are reserved for sign representation—4 combinations for plus and 2 for minus. The other 10 are illegal, shown in Table 5 following.

TABLE 5

Packed Decimal Elements

| Digit Quartets | | Sign Quartets | | |
|---|---|---|---|---|
| bits | digits | bits | usual | B-signs |
| 0000 | 0 | 0000 | illegal | unused |
| 0001 | 1 | 0001 | " | " |
| 0010 | 2 | 0010 | " | " |
| 0011 | 3 | 0011 | " | " |
| 0100 | 4 | 0100 | " | (year increment) |
| 0101 | 5 | 0101 | " | (16xx) |
| 0110 | 6 | 0110 | " | (17xx) |
| 0111 | 7 | 0111 | " | (18xx) |
| 1000 | 8 | 1000 | " | (19xx) |
| 1001 | 9 | 1001 | " | (20xx) |
| 1010 | illegal | 1010 | plus | unused |
| 1011 | " | 1011 | minus | " |
| 1100 | " | 1100 | plus | " |
| 1101 | " | 1101 | minus | " |
| 1110 | " | 1110 | plus | " |
| 1111 | " | 1111 | plus | " |

As packing does not check for valid digit and sign codes, values conditioned at entry be assigned an appropriate Bemer sign, or B-sign, upon entry, from the illegal group. When fetching them for the ReSub, the sign may be extracted for its purpose and replaced by a + sign for actual register arithmetic to occur.

In choosing the specific quartets to represent millennium and century it is tempting at first to use the two standard minus signs, knowing that a year may never have a negative value. But a much better choice is to use the same groups as for Bigits, which handle five centuries, not just two, and a year increment indicator, too.

Comparing Normal and B-form Packed Decimal representations

Normal Packed Decimal uses 3 octets to represent a 4-digit year (rows a,b); 2 octets to represent a 2-digit year (rows c,d). B-form Packed Decimal uses 2 octets to represent a 4-digit year (rows e,f) (Table 6).

TABLE 6

Normal vs. B-Sign Modified Packed Decimal

| octet | | octet | | octet | | year | Case |
|---|---|---|---|---|---|---|---|
| fill | 1 | 9 | 9 | 8 | + | 1998 | a |
| 0000 | 0001 | 1001 | 1001 | 1000 | ssss | | |
| fill | 2 | 0 | 0 | 3 | + | 2003 | b |

TABLE 6-continued

Normal vs. B-Sign Modified Packed Decimal

| octet | | octet | | octet | | year | Case | |
|---|---|---|---|---|---|---|---|---|
| 0000 | 0010 | 0000 | 0000 | 0011 | ssss | | | |
| | fill | 9 | 8 | + | | 98 | c | |
| | | 0000 | 1001 | 1000 | ssss | | | |
| | fill | 0 | 3 | + | | 03 | d | |
| | | 0000 | 0000 | 0011 | ssss | | | |
| | fill | 9 | 8 | MC | | 1998 | e | |
| | | 0000 | 1001 | 1000 | 1000 | ← | ← | indicates 19xx |
| | fill | 0 | 3 | MC | | 2003 | f | |
| | | 0000 | 1001 | 1000 | 1001 | ← | ← | indicates 20xx |

"ssss" can be 1010, 1100, 1110, or 1111. Multiple sign forms are tolerable in usual packed decimal format; nothing else can be done with them. Even hardware comparison accepts them as a single sign.

All year calculations being done in context, by a method outside normal rules, only one quartet is used for each millennium-century (MC). Note that if the MC quartet replaces the fill quartet, and is itself set to 0, decimal arithmetic comparison works directly.

Here also, the direct hardware compare operation will not work. A subroutine is required. The question is when to apply it. Common combinations of entry, validation, and conversion from zoned to Packed Decimal form are shown in Table 7.

TABLE 7

| Case | Enter via | Validated to PD | To host | Validated to PD | Stored | Use to PD | Use |
|---|---|---|---|---|---|---|---|
| 2 | PC | PC | — | zoned | — | host | PD | use | — | — |
| 3 | PC | — | — | zoned | host | — | zoned | — | host | use |
| 4 | PC | — | — | zoned | host | host | PD | use | — | — |
| 5 | PC | PC | PC | PD | — | — | PD | use | — | — |
| 11 | DT | — | — | zoned | host | — | zoned | — | host | use |
| 12 | DT | — | — | zoned | host | host | PD | use | — | — |

PC = Personal Computer
PD = Packed Decimal
DT = Dumb Terminal

Existing Data with Year Values

Existence of a Bigit in the tens position of a year value (a MCD Bigit) means a year value of 16xx to 20xx. No other use will ever be made. Bigits conflict with neither decimal nor sign values. All new input arrives in that form, ready for:

1) arithmetic operation with a year increment value,
2) comparison with another year value.

With this method one can recognize an existing year value in 2-digit form, and store resulting year values in Bigit form.

The decision, while searching, to make or not make a ReSub is illustrated here with opcodes and other data from packed decimal arithmetic of IBM equipment. The typical PD instruction form is:

| 8 bits | Opcode "11110010" for pack |
| | Opcode "11110011" for unpack |
| | Opcode "11111001" for decimal compare |
| | Opcode "11111010" for decimal addition |
| | Opcode "11111011" for decimal subtraction |
| | Opcode "11111100" for decimal multiplication |
| | Opcode "11111101" for decimal division |
| 4 bits | First operand length L1 |
| 4 bits | Second operand length L2 |

In IBM's SS format, L1 and L2 represent the number of additional bytes to the left of the byte addressed, and thus are one less than the length of the operand in bytes. Pack and unpack operate on the second operand and put the result into the first operand. Table 8 shows the possible combinations:

TABLE 8

Pack & Unpack Operation Limits

| OpCode for | | L1 out | L1 bytes | L2 in | L2 bytes | L2 content |
|---|---|---|---|---|---|---|
| PACK | pack 1 z byte | 0+ | 1+ | 0 | 1 | C |
| | 2 | 1+ | 2+ | 1 | 2 | CC |
| | 2 | 1+ | 2+ | 1 | 2 | YY |
| | 3 | 1+ | 2+ | 2 | 3 | CCC |
| | 4 | 2+ | 3+ | 3 | 4 | YYYY |
| UNPAC | unpack 1 byte | 0+ | 1+ | 0 | 1 | cs |
| | 2 | 2+ | 2,3+ | 1 | 2 | 0ccs |

TABLE 8-continued

Pack & Unpack Operation Limits

| OpCode for | L1 out | L1 bytes | L2 in | L2 bytes | L2 content |
|---|---|---|---|---|---|
| 2 | 2+ | 2,3+ | 1 | 2 | 0yys |
| 2 | 2+ | 3+ | 1 | 2 | cccs |
| 3 | 3+ | 4+ | 2 | 3 | 0yyyys |

Decimal operation on year values are identified by restricted sets of operators and operand lengths, as shown in Tables 9a and 9b.

TABLE 9a

Possible Opcodes & Lengths for Pack/Unpack/Compare

|  | Opcode | Op A | Op B | PACKED | UNPACK | Note |
|---|---|---|---|---|---|---|
| PACK | 11110010 | 0000 | 0000 | C | C | 2 |
| " |  | 0001 | 0000 | 0C | C | 2,4 |
| " |  | 0001 | 0001 | CC | CC | 2 |
| " |  | " | " | YY | YY |  |
| " |  | 0010 | 0001 | 0CC | CC | 4 |
| " |  | " | " | 0YY | YY | 4 |
| " |  | 0001 | 0010 | CCC | CCC | 2 |
| " |  | 0010 | 0010 | 0CCC | CCC | 2,4 |
| " |  | 0010 | 0011 | YYYY | YYYY |  |
| " |  | 0011 | 0011 | 0YYYY | YYYY | 4 |

|  | Opcode | Op A | Op B | UNPACK | PACKED | Note |
|---|---|---|---|---|---|---|
| UNPACK | 11110011 | 0000 | 0000 | C | C | 2 |
| " |  | 0001 | 0000 | 0C | C | 2,4 |
| " |  | 0010 | 0001 | CC | CC | 2 |
| " |  | " | " | YY | YY |  |
| " |  | " | " | CCC | CCC | 2 |
| " |  | 0011 | 0001 | 0CC | CC | 2,4 |
| " |  | " | " | 0YY | YY | 4 |
| " |  | " | " | 0CCC | CCC | 2,4 |
| " |  | 0011 | 0010 | YYYY | YYYY |  |
| " |  | 0100 | 0010 | 0YYYY | YYYY | 4 |

|  | Opcode | Op A | Op B |  |  | Note |
|---|---|---|---|---|---|---|
| COMPARE | 11111001 | 0001 | 0000 | YY | C | 2 |
| " |  | 0001 | 0001 | YY | CC | 2 |
| " |  | 0001 | 0001 | YY | YY |  |
| " |  | 0001 | 0010 | YY | CCC | 5 |
| " |  | 0001 | 0011 | YY | YYYY |  |
| " |  | 0011 | 0001 | YYYY | YY |  |
| " |  | 0011 | 0011 | YYYY | YYYY |  |

TABLE 9b

Possible Opcodes and Lengths for "Year Arithmetic"

|  | Opcode | Op A | Op B | Type OpA | Type OpB | Note |
|---|---|---|---|---|---|---|
| ADD | 11111010 | 0000 | 0000 | C | C | 2 |
| " |  | 0000 | 0001 | C | CC | 2 |
| " |  | " | " | C | YY |  |
| " |  | 0000 | 0010 | C | CCC | 2 |
| " |  | 0001 | 0000 | CC | C | 2 |
| " |  | " | " | YY | C |  |
| " |  | 0001 | 0001 | CC | CC | 2 |
| " |  | " | " | CC | YY |  |
| " |  | " | " | YY | CC |  |
| " |  | 0001 | 0010 | CC | CCC | 2 |
| " |  | 0001 | 0010 | YY | CCC | 5 |
| " |  | 0010 | 0000 | CCC | C | 2 |
| " |  | 0010 | 0001 | CCC | CC | 2 |
| " |  | " | " | CCC | YY | 5 |
| " |  | 0010 | 0010 | CCC | CCC | 2 |
| SUBTRACT | 11111011 | 0000 | 0000 | C | C | 2 |
| " |  | 0000 | 0001 | C | CC | 2 |
| " |  | 0000 | 0010 | C | CCC | 2 |
| " |  | 0001 | 0000 | CC | C | 2 |
| " |  | " | " | YY | C |  |
| " |  | 0001 | 0001 | CC | CC | 2 |
| " |  | " | " | YY | CC |  |
| " |  | " | " | CC | YY |  |
| " |  | " | " | YY | YY |  |
| " |  | 0001 | 0010 | CC | CCC | 2 |
| " |  | " | " | YY | CCC | 2 |
| " |  | 0001 | 0011 | YY | YYYY |  |
| " |  | 0010 | 0000 | CCC | C | 2 |

TABLE 9b-continued

Possible Opcodes and Lengths for "Year Arithmetic"

|  | Opcode | Op A | Op B | Type OpA | Type OpB | Note |
|---|---|---|---|---|---|---|
| " |  | 0010 | 0001 | CCC | CC | 2 |
| " |  | 0010 | 0010 | CCC | CCC | 2 |
| " |  | 0011 | 0001 | YYYY | YY |  |
| " |  | 0011 | 0011 | YYYY | YYYY |  |
| MULTIP | 11111100 | 0000 | 0000 | C | C | 2 |
| " |  | 0000 | 0000 | C | C | 2 |
| " |  | 0000 | 0001 | C | CC | 2 |
| " |  | 0000 | 0001 | C | CC | 2 |
| " |  | 0001 | 0000 | CC | C | 2 |
| " |  | 0001 | 0000 | CC | C | 2 |
| DIVIDE | 11111101 | 0000 | 0000 | C | C | 3 |
| " |  | 0000 | 0001 | C | CC | 3 |
| " |  | 0001 | 0000 | CC | C | 2 |
| " |  | 0001 | 0001 | CC | CC | 3 |
| " |  | 0010 | 0000 | CCC | C | 2 |
| " |  | 0010 | 0001 | CCC | CC | 2 |

Thus only a subset of possible combinations are candidates. In theory, 33 out of 2 power 16 (65536) combinations =1 in 1985! (Pack and Unpack usually occur only upon input/output; frequency is much less than the other operations). Actually operations on small numbers are more frequent, and the set of operations may not be full. So perhaps 1 in 500 instructions might be candidates. That is 0.2% of all instructions.

Assume that each ReSub might consume 12 words in instructions and tables. So instruction space might be increased 2.4% at first by brute force programming methods. Later deletion of useless ReSubs could bring this down to an operational 0.5%, or 60K instructions—instructions—not enough to cause undue delay on schedules or on operating speed, or the purchase of additional hardware. But even this increase may be a high estimate. Programming methods and tables can reduce it.

Other Arithmetic Types

For independent PC usage, independent of mainframe host computer, the crux is that decimal arithmetic in a PC is done differently from the customary host. Bigits might not be applicable, or necessary, there. However, one may assume:

Average age of PC programs is 20 to 30 years less than in mainframes.

They are unlikely to have source code in obsolete languages.

The source code is more likely to exist and be maintained.

Use of year values may well be in 4-digit form; if not, conversion at source level is relatively easy.

Output Conversion and Display

Data output may be to storage, transferred, visual (printed), and diagnostic. Questions may be asked as to what happens to Bigit characters upon output. The first question is whether calendar year values will occupy 2 or 4 positions of output—a nontrivial question. For many purposes, such as diagnostics, storage, and some transfers, the 2-digit form of a 4-digit year is quite adequate. A 4-digit form will be necessary for data transfer to systems that use nothing but 4-digit calendar years and unmarked year increments, or else for systems in a transitional hybrid mode where both 2-digit and 4-digit year forms coexist. For display, however, a choice of forms may be made.

Displaying 2-digit Years with ASCII

Although a 4-digit form is always preferable, note the existing font options for screen or laser printer display. Such fonts are registered in Geneva, Switzerland, by ECMA, the European Computer Manufacturers Association, as agent for the International Standards Organization. A new font may be registered whenever justified by sufficient need. Laser printers use a font as selected from a set of such fonts; PCs may be modified, for example, to display Russian Cyrillic instead of Roman ASCII characters. Hardware and software loading of such fonts is established practice.

The choice of position made to demonstrate and explain Bigits was not arbitrary. Among other reasons, such as collatability and the relation to sign values in packed decimal arithmetic, Bigits for 19xx and 20xx, particularly, lie in the upper portion of ASCII (b8=1, not 0). Quite a number of alternate fonts contain ASCII in the lower portion (b8=0) and various other graphics in the upper portion.

Table 10 shows printed output for untransformed Bigits (no font change) for OKIData's IBM-PC font. The two columns chosen for 19xx and 20xx show accented characters in those positions, as the font shows the primary attributes of those coded characters. The font ECMA-94 would print blanks there, not accented characters.

TABLE 10

OKIData IBM-US Font

```
ASCII digits┐        Bigit area
            │    <<───────────>>
            0 0 0 0 0 0 0 0 1 1 1 1 1 1 1 1
            0 0 0 0 1 1 1 1 0 0 0 0 1 1 1 1
            0 0 1 1 0 0 1 1 0 0 1 1 0 0 1 1
            0 1 0 1 0 1 0 1 0 1 0 1 0 1 0 1

0 0 0 0     0 @ P ` p Ç É
0 0 0 1     1 A Q a q ü æ
0 0 1 0     2 B R b r é Æ
0 0 1 1     3 C S c s â ô
0 1 0 0     4 D T d t ä ö
0 1 0 1     5 E U e u à ò
0 1 1 0     6 F V f v å û
0 1 1 1     7 G W g w ç ù
1 0 0 0     8 H X h x ê ÿ
1 0 0 1     9 I Y i y ë ö
1 0 1 0
1 0 1 1                     Bigits for
1 1 0 0                     ── years 20xx
1 1 0 1                     ── years 19xx
1 1 1 0                     ── years 18xx (if needed)
1 1 1 1                     ── years 17xx (if needed)
year increments             ── years 16xx (if needed)
```

Postulate a new graphic font, hereafter "Millennium ASCII", in which the space of the 9th and 10th columns is populated by:

In the columns with hi zone 1000, graphics for the customary 10 digits, but containing an underline or other specific graphic distinction to imply a prefix "19".

In the columns with hi zone 1001, graphics for the customary 10 digits, but containing an overline or other specific graphic distinction to imply a prefix "20".

Now the output is as shown in Table 11 when the font is changed to Millennium ASCII. Note optimum working with an English alphabet.

TABLE 11

Millennium ASCII Font

```
ASCII digits┐        Bigit area
            │    <<───────────>>
            0 0 0 0 0 0 0 0 1 1 1 1 1 1 1 1
            0 0 0 0 1 1 1 1 0 0 0 0 1 1 1 1
            0 0 1 1 0 0 1 1 0 0 1 1 0 0 1 1
            0 1 0 1 0 1 0 1 0 1 0 1 0 1 0 1

0 0 0 0     0 @ P ` p 0 0̄         underlined
0 0 0 1     1 A Q a q 1 1̄         & overlined
0 0 1 0     2 B R b r 2 2̄         graphics
0 0 1 1     3 C S c s 3 3̄         make the
0 1 0 0     4 D T d t 4 4̄
0 1 0 1     5 E U e u 5 5̄
0 1 1 0     6 F V f v 6 6̄         ┌─────────┐
0 1 1 1     7 G W g w 7 7̄         │Millennium│
1 0 0 0     8 H X h x 8 8̄         │ASCII set │
1 0 0 1     9 I Y i y 9 9̄         └─────────┘
1 0 1 0
1 0 1 1                             Y-Bigits for
1 1 0 0                             ── years 20xx (overline)
1 1 0 1                             ── years 19xx (underline)
1 1 1 0                             ── years 18xx (if needed)
1 1 1 1                             ── years 17xx (if needed)
year increments                     ── years 16xx (if needed)
```

Fonts for the Millennium ASCII set may be incorporated in hard or soft fonts for laser printers, hardcopy printers, and video screen. One can imagine future users and recipients of computer out who are at ease with the two digits—1) an overlined 3 followed by 2) a plain 8—to mean the year 2038. Even on their paychecks, if necessary. Or, for untreated 4-digit year forms, an underline of the millennium digit, which is either a "1" or a "2".

In designing graphics for Bigit characters in Millennium ASCII, styling other than underline and overline could be made, provided standard digit shapes remain as a components of each character. Millenniem ASCII may be used to display calendar years in both 2- and 4 form, and also for diagnostic purposes. I.e., if the display is in 4-digit form, and the transformation not made, the mistake is obvious in the printed result.

Displaying 2-digit Years with EBCDIC

EBCDIC uses the zone positions chosen above for a substantial part of the lower case alphabet, as shown in Table 12.

TABLE 12

EBCDIC Font

```
                    Bigit area        EBCDIC digits
                 <<            >>
                 0 0 0 0 0 0 0 0 1 1 1 1 1 1 1 1
                 0 0 0 0 1 1 1 1 0 0 0 0 1 1 1 1
                 0 0 1 1 0 0 1 1 0 0 1 1 0 0 1 1
                 0 1 0 1 0 1 0 1 0 1 0 1 0 1 0 1
  0 0 0 0              & -                     0
  0 0 0 1              /     a j                1
  0 0 1 0                    b k                2
  0 0 1 1                    c l                3
  0 1 0 0                    d m                4
  0 1 0 1                    e n                5
  0 1 1 0                    f o                6
  0 1 1 1                    g p                7
  1 0 0 0                    h q                8
  1 0 0 1                    i r                9
  1 0 1 0                              Y-Bigits for
  1 0 1 1                              years 20xx
  1 1 0 0                              years 19xx
  1 1 0 1                              years 18xx (if needed)
  1 1 1 0                              years 17xx (if needed)
  1 1 1 1                              years 16xx (if needed)
  year increments
```

One might opt to live with these being printed in the decade field position. Or perhaps still operate with underlined and over-lined digit graphics, but with hi zones different from ASCII. This might, however, cause incompatibility for computers operating with both sets of graphics. In inherent design layout, EBCDIC cannot be as accommodating and flexible as ASCII for these purposes. IBM users may opt to always use ASCII for output, especially as that pair of coded sets have a 1-to-1 correspondence embedded in hardware chips.

Displaying 4-digit Years

Formats for displayed output are already known and modifiable, just as input display screens or questions are.

For display on a PC screen, the transformation may occur in the PC programing.

For printed output (reports, checks, bills, etc.) the transformation must occur prior to release from the originating computer.

Bigits not transformed prior to printing or display, will (in a few cases for ASCII, most cases for EBCDIC) print or display a blank character, and will (in most cases for ASCII, and in a few cases for EBCDIC) print or display an entirely strange character, depending upon the font loaded in the display or print devices.

Except that any blank characters above may be made visible with the Millennium ASCII font.

Diagnosis by Search

At any time, in the process of converting to operate under the methods of this invention, year and year increment values may also be located in stored data by using the same text processing search engine used for YPP, thus finding:

Pairs of adjacent characters where the left character is a Y-Bigit having a hi zone of 0101 up to 1001 and a lo zone of a binary digit, the right character being a decimal digit. I.e., 2-digit calendar year values.

One, two, (or in the future three) adjacent characters where the rightmost character is an I-Bigit having a hi zone of 0100 and a lo zone of a binary digit 0–9, and the remainder digits (if any) to the left are decimal digits. I.e., year increment values.

Groups of four characters where the leftmost is a Bigit having a hi zone of 1000, and the other three are decimal digits. I.e., calendar year values of 4 digits.

The starting addresses for such groups may be put into a table referred to by output programs.

Diagnosis by Malfunction

Three output transformations that must occur are:

a) Reconstruction to a 4-digit form from the Y-Bigit (the second character from the right) in calendar year fields, and b) correction of the hi zone bits of an I-Bigit in the rightmost character of year increment fields.

c) correction of the hi zone bits of the Bigit in the leftmost character of 4-digit calendar year fields.

Presumably the rework of output displays to show all 4 digits of calendar years will incorporate these transformations somewhere between storage and display. If not, such malfunctions may be detected by:

Every time a screen is refreshed for a new display, put a solid block character in the M and C positions of a calendar year, and in the units position of a year increment. Unless these are overwritten, an error is obvious.

Let the characters print as they will in test runs, and examine those that show up in such fields for appropriateness.

Coexistence of Mixed Year Forms

This invention will be used in an everchanging environment. Some users may be far along in converting programs to full 4-digit-year usage; some may have progressed without yet finding and changing all occurrences of 2-digit years; some will need to exchange year data with others still using plain 2-digit or Bigit forms. But now all changed values are located, so they may be transformed. Thus some coexistence method must be given for both 4-digit and 2-digit year forms.

For Tables 13 and 14, "aa"="00" for ASCII, "11" for EBCDIC. Two methods are shown.

Method A is to make the MC marker "1000" dual-purpose—the hi zone both in the decade position of 2-digit year values and in the millennium position of 4-digit year values.

Method B is to make the year increment marker "0100" dual-purpose—the hi zone in the units position of year increments of 1, 2, or 3 digits—and as the hi zone in the decade (or tens) position of the 4-digit year values.

Method A is preferred for output and collating sequence reasons. Method B is shown only as an alternative. Note that both give the same packed decimal forms.

TABLE 13

Summary of 8-bit Byte (zoned) Forms:

| hi | lo | hi | lo | hi | lo | hi | lo | | |
|---|---|---|---|---|---|---|---|---|---|
| | | | | | | aa11 | nnnn | | 1-digit number |
| | | | | aa11 | nnnn | aa11 | nnnn | | 2-digit number |
| aa11 | nnnn | aa11 | nnnn | aa11 | nnnn | | | | 3-digit number |
| | | | | | | 0100 | nnnn | | 1-Bigit year increment |
| | | | | aa11 | nnnn | 0100 | nnnn | | 2-Bigit year increment |
| aa11 | nnnn | aa11 | nnnn | 0100 | nnnn | | | | 3-Bigit year increment |
| crisis form --> | | aa11 | dddd | aa11 | yyyy | | | | 2-digit year |
| | | 0101 | dddd | aa11 | yyyy | | | | 2-Bigit year 16 dy |
| | | 0110 | dddd | aa11 | yyyy | | | | 2-Bigit year 17 dy |
| | | 0111 | dddd | aa11 | yyyy | | | | 2-Bigit year 18 dy |
| | | 1000 | dddd | aa11 | yyyy | | | | 2-Bigit year 19 dy |
| | | 1001 | dddd | aa11 | yyyy | | | | 2-Bigit year 20 dy |

Method A

| aa11 | nnnn | aa11 | nnnn | aa11 | nnnn | aa11 | nnnn | 4-digit number |
|---|---|---|---|---|---|---|---|---|
| 1000 | mmmm | aa11 | cccc | aa11 | dddd | aa11 | yyyy | 4-Bigit year |

Method B

| aa11 | nnnn | aa11 | nnnn | aa11 | nnnn | aa11 | nnnn | 4-digit number |
|---|---|---|---|---|---|---|---|---|
| aa11 | mmmm | aa11 | cccc | 0100 | dddd | aa11 | yyyy | 4-Bigit year |

Summary of Packed Decimal Forms
(programmed, not built-in, conversion)

| hi | lo | hi | lo | hi | lo | | |
|---|---|---|---|---|---|---|---|
| | | | | nnnn | 0100 | | 1-digit year increment |
| | | 0000 | nnnn | nnnn | 0100 | | 2-digit year increment |
| | | nnnn | nnnn | nnnn | 0100 | | 3-digit year increment |
| crisis form --> | 0000 | dddd | yyyy | ssss | | | 2-digit year |
| | 0000 | dddd | yyyy | 0101 | | | 2-digit year 16 dy |
| | 0000 | dddd | yyyy | 0110 | | | 2-digit year 17 dy |
| | 0000 | dddd | yyyy | 0111 | | | 2-digit year 18 dy |
| | 0000 | dddd | yyyy | 1000 | | | 2-digit year 19 dy |
| | 0000 | dddd | yyyy | 1001 | | | 2-digit year 20 dy |
| 0000 | mmmm | cccc | dddd | yyyy | 0100 | | 4-digit year |

Also, with the marker for 4-digit year values applied in the hi zone of the millennium digit (Method A), or in the hi zone of the decade digit (Method B), the normal collating (sorting or ordering) processes still apply without modification, with obvious exception that they will not work with intermingled forms—both 2-digit and 4-digit; ordering fields must always be of the same length.

Note that the sign position of the modified packed decimal form, as this is created by the programmed packing routine, comes from the hi zone of the Y-Bigit in the tens position, not from the hi zone of the units position as in hardware, except for the 4-digit year form of Method A, where the hi zone of the millennium position ("1000") translates to "0100". Choosing the "1000" was made for the advantage of printing visibly without programmed conversion if the Millennium ASCII font is used; the "1" of "19" and the "2" of "20" both print underscored, but may be ignored in context. It also works correctly for ordering.

There is no overlap or conflict between year increments, which will be 1 or 2 bytes of length in packed decimal arithmetic, and a 4-digit year, which will be 3 bytes in length. The length is the differentiating factor, despite the same "0100".

Note that this invention is superior even to using plain year values because the type, for both 2-digit and 4-digit years, and for year increments, is identified by the data itself, not defined by a source program.

The choice of storing and using either 2-digit or 4-digit forms or both is made in the data entry routines.

Summary Diagrams

The 16×16 matrix customarily used to display both ASCII and EBCDIC is now the basis for full display of some major attributes of the invention.

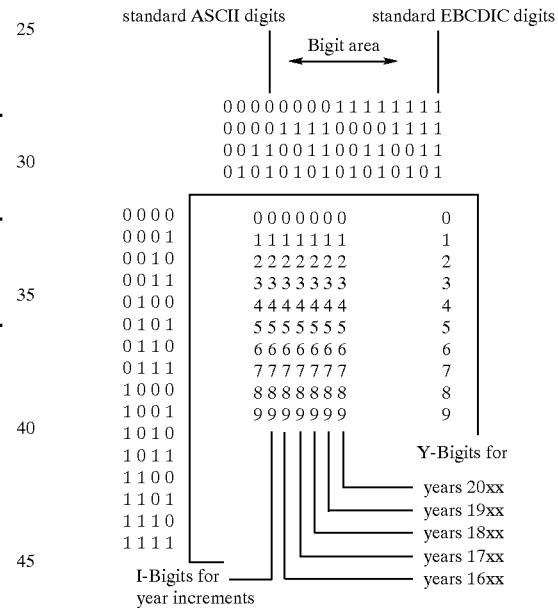

Thus the ASCII digit 5 is:

zone 5
0011 0101

The EBCDIC digit 5 is:

zone 5
1111 0101

These examples are given in ASCII. For EBCDIC the zone is 1111.

| | | | | | |
|---|---|---|---|---|---|
| The DY form of the 2-digit year 97 is: | | | | zone 9 0011 1001 D | zone 7 0011 0111 Y |
| The MCDY form of the 4-digit year 1997 is: | zone 1 0011 0001 M | zone 9 0011 1001 C | zone 9 0011 1001 D | zone 7 0011 0111 Y | |
| The BCDY form of the 4-digit year 1997 is: | zone 1 1000 0001 B | zone 9 0011 1001 C | zone 9 0011 1001 D | zone 7 0011 0111 Y | |
| The BY (Bigit) form of the 4-digit year 1997 is: for 19xx ⎦ | | | zone 9 1000 1001 B | zone 7 0011 0111 Y | |
| The BY (Bigit) form of the 4-digit year 2006 is: for 20xx ⎦ | | | zone 0 1001 0000 B | zone 6 0011 0110 Y | |
| Packed decimal form for the 2-digit year 97 is: | | | fill 9 0000 1001 f d | 7 + 0111 1010 y s | |
| Packed decimal form for the 4-digit year 1997 is: | | fill 1 0000 0001 f m | 9 9 1001 1001 c d | 7 + 0111 1010 y s | |
| Packed decimal B-sign form for the 4-digit year 1997 is: for 19xx ⎦ | | | fill 9 0000 1001 f d | 7 MC 0111 1000 y b | |
| The unmarked form of a year increment of 25 is: | | | zone 2 0011 0010 | zone 5 0011 0101 | |
| The Bigit form of a year increment of 25 is: year increment indicator ⎦ | | | zone 2 0011 0010 | zone 5 0100 1010 | |

What is claimed is:

1. A method for modifying an object program, the original program, of a digital data processing system having a coded character set with each character of said coded character set having a single attribute such as a digit, hereafter a digit character, said original program including dates in which the year value of the date is defined by two digit characters; comprising the steps of:

A, providing selected subsets of said coded character set with a second attribute, said coded characters of the selected subsets whose second attribute is relevant hereafter referred to as Bigits; a Bigit whose second attribute defines a millennium, M, century, C, and decade, D, of a year value is hereafter a Y-Bigit, and a Bigit whose second attribute is a year increment value is hereafter an I-Bigit;

B, searching the original program to find year arithmetic operations involving two operands at least one of which consists of two digit characters;

C, for each such year arithmetic operation, replacing it with a jump-return instruction to a subroutine (Resub) including means for fetching the two operands of the instruction from memory, for checking both operands to determine if either or both includes a Bigit, if not executing the original replaced command and returning to the modified original program; if either one or both of the operands includes a Bigit, converting the operand including two characters, the most significant character of which is a Y-Bigit, to four digit characters representing M, C, D and Y; performing the said year arithmetic operation on the converted operands to produce a result operand, if the result operand consists of four characters, converting the four characters of the result operand to two characters, the more significant one of which is a Y-Bigit; if the result operand consists of less than four characters, converting the least significant character to an I-Bigit, and storing the converted result operand in memory locations specified in the original program;

D, including in the Resub a use field initially set to indicate "no use" which is changed to indicate "use" when a fetched operand is checked in step C is found to contain a Bigit;

E, searching the original program to find all data output operations of only two digit characters; for each such data output operation creating a Resub, said Resub determining if either of the characters is a Bigit, if not, executing the original instruction and returning to the main object program; if one is a Bigit, if the Bigit is a Y-Bigit converting the characters to four digit characters representing M, C, D and Y; if the Bigit is an I-Bigit, converting the I-Bigit to a digit character whose lo zone bits are the same as those of the I-Bigit; executing the output operation and returning to the main object program;

F, modifying the data entry routine of the program to enter four digits to identify the year portion of a date, M, C, D, Y; and to identify digits defining a year increment value;

G. converting M, C, and D of the year value of a date as entered in step F to a Y-Bigit, and Y to a digit character; and converting a year increment value as entered in step F to an I-Bigit in the least significant digit position of the year increment value with higher order digits of a year increment value to digit characters;

H, storing the two coded characters representing M, C, D and Y values and the characters representing year increment values produced in step G in memory locations specified by the original program; and I, after a reasonable period of time has elapsed, checking the use field of each Resub to determine the status of its use fields, and if the use field indicates no use, deleting that Resub and replacing its jump with the original instruction.

2. The method of claim 1 in which year arithmetic operations include decimal addition, decimal subtraction and decimal compare operations.

3. The method of claim 2 in which the result of year arithmetic operations are positive.

4. The method of claim 3 in which the coded character set is ASCII.

5. The method of claim 3 in which the coded character set is EBCDIC.

6. The method of claim 3 in which the year arithmetic operations includes a pack operation code and an unpack operation code.

7. The method of claim 3 in which the data output ReSub on determining if one of the two digit characters is a Y-Bigit identifies the Y-Bigit by a special graphic symbol.

8. A method of solving the millennium problem of an object program, hereafter the original program, of a digital data processing system in which the year value of a date is defined by two bytes of a coded character set of bytes defining a digit, hereafter a digit character, with each character of the coded character set being divided into a hi zone of bits and a lo zone of bits, comprising the steps of:

A, providing selected subsets of said coded character set with a second attribute, said coded characters of the selected subsets whose second attribute is relevant hereafter referred to as Bigits; a Bigit whose second attribute defines a millennium, M, century, C, and decade, D, of a year value is hereafter a Y-Bigit, and a Bigit whose second attribute is a year increment value is hereafter an I-Bigit;

B, modifying the data entry routine of the original program to require the year value of a date to be entered as four digits, said four digits being M, C, D, and Y; converting M, C, D, and Y each to a digit character of the coded character set; and converting the digit characters for M, C, and D to a Y-Bigit;

1, converting the Y-Bigit and the digit character for Y to a two-byte operand in a modified packed decimal format with the lo zone of the lower order byte of the modified packed decimal operand being the hi zone bits of the Y-Bigit and the hi zone bits of the lower order byte being the lo zone bit of the digit character for Y; the lo zone bits of the higher order byte of the operand being the lo-zone bits of the Y-Bigit and the hi-zone bits being a set of zero fill bits;

2, storing the two bytes produced in Step 1 in the memory location specified by the original program;

C, searching the original program to find all year arithmetic operations involving two operands in which at least one of the two operands consists of two digits;

1, for each year arithmetic operation, replacing it with a jump-return instruction to a subroutine which subroutine is created concurrently with the jump-return instruction, which subroutine gets the two operands from memory, checks both operands to determine if either or both operands consists of two bytes in the modified packed decimal format, if not returning to the original program; if either one or both of the operands is in the modified packed decimal format, converting the operand in modified packed decimal format into three bytes in packed decimal format representing the values M, C, D, and Y; performing the year arithmetic operation on the operands to yield a result operand; if the result operand consists of four decimal digits in packed decimal format, modifying the result operand to include two bytes in the modified packed decimal format, and storing the result operand in memory locations specified in the object program;

2, including in the subroutine a use field initially set to indicate "no use" which is changed to indicate "use" when the subroutine is executed; and 3, returning to the program;

D, searching the original program to find all data output operations of only two digits;

1, for each such data output operation, replacing it with a jump-return instruction to a subroutine, said subroutine determining if the two decimal digits are in the modified packed decimal format, if not executing the original instruction and returning to the main program; if in the modified packed decimalformat, converting the two bytes in modified packed decimal format to four digit characters of the coded character set representing M, C, D, and Y; and performing the data output operation of the four digits, and returning to the main program; and 2, including in the subroutine a use field initially set to indicate "no use" which is changed to indicate "use" when the subroutine is executed;

E. After a reasonable period of time has elapsed after this method has been in use, checking the subroutine associated with each jump-return instruction to determine the status of its use field, if the use field indicates no use, replacing that jump-return instruction with the original instruction and deleting its associated subroutine.

9. The method of claim 8 in which year arithmetic operations include decimal addition, decimal substraction and decimal compare operations.

10. The method of claim 9 in which the result of year arithmetic operations are positive.

11. The method of claim 10 in which the coded character set is EBCDIC.

12. The method of claim 11 in which the year arithmetic operations include a pack operation code and an unpack operation code.

13. The method of claim 12 in which the data output ReSub, on determining that one of the two digit characters to be output is a Y-Bigit, identifies the Y-Bigit attribute by a special graphic symbol.

* * * * *

UNITED STATES PATENT AND TRADEMARK OFFICE
CERTIFICATE OF CORRECTION

PATENT NO. : 5,978,809         Page 1 of 2
DATED      : November 2, 1999
INVENTOR(S) : Bemer It is certified that error appears in the above-indentified patent and that said Letters Patent is hereby corrected as shown below:

| | |
|---|---|
| Col. 1, line 34 | Delete "denot" and insert --denote-- |
| Col. 16, line 21 | Delete "I * C * I and insert --I * C = I-- |
| Col. 18, line 39 | After "entry " insert --may-- |
| Col. 21, line 35 | After TABLE 9a, insert: |

--Notes for Tables 9a and 9b
1. Illegal combinations of Appendix A are not shown.
2. Low probability of concerning year values.
3. Illegal. Dividend must have more digits than divisor.
4. In case of intentional zero packing in the object code.
5. Very rare.

UNITED STATES PATENT AND TRADEMARK OFFICE
CERTIFICATE OF CORRECTION

PATENT NO. : 5,978,809
DATED : November 2, 1999
INVENTOR(S) : Bemer

It is certified that error appears in the above-identified patent and that said Letters Patent is hereby corrected as shown below:

| | |
|---|---|
| Col. 24, line 40 | Delete "screen" and insert --screens-- |
| Col. 24, line 41 | Delete "out" and insert --output-- |
| Col. 24, line 51 | Delete "Millenniem" and insert --Millennium-- |
| Col. 29, line 31 | Delete "1010" and insert --0101-- |

Signed and Sealed this

Twenty-third Day of May, 2000

Attest:

Q. TODD DICKINSON

*Attesting Officer*        *Director of Patents and Trademarks*